Nov. 12, 1963   E. H. BAXA   3,110,483
METHOD OF AND APPARATUS FOR REMOVING ALKALI FROM CEMENT SYSTEM
Filed Aug. 15, 1961
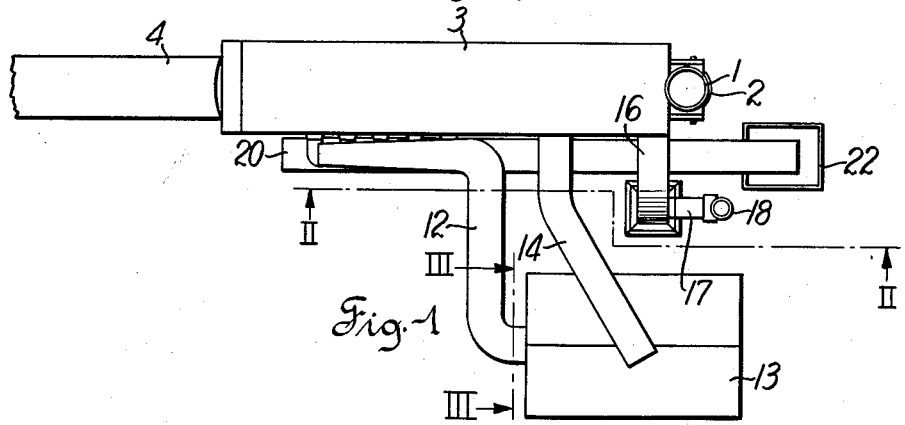
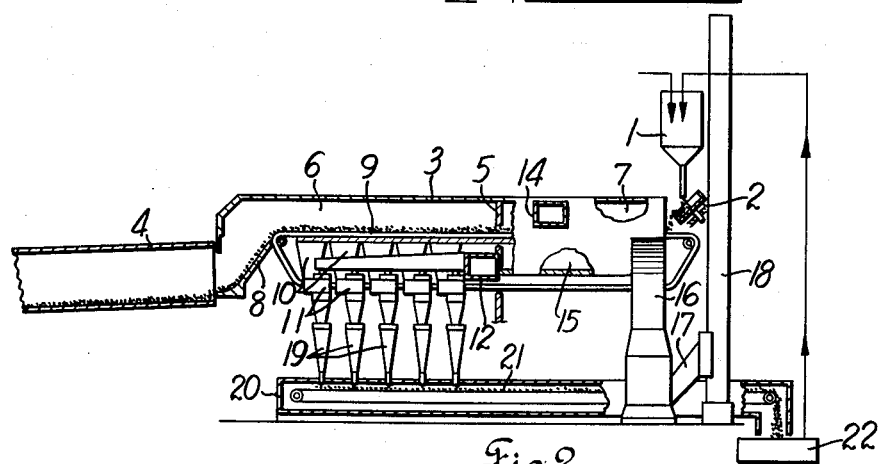
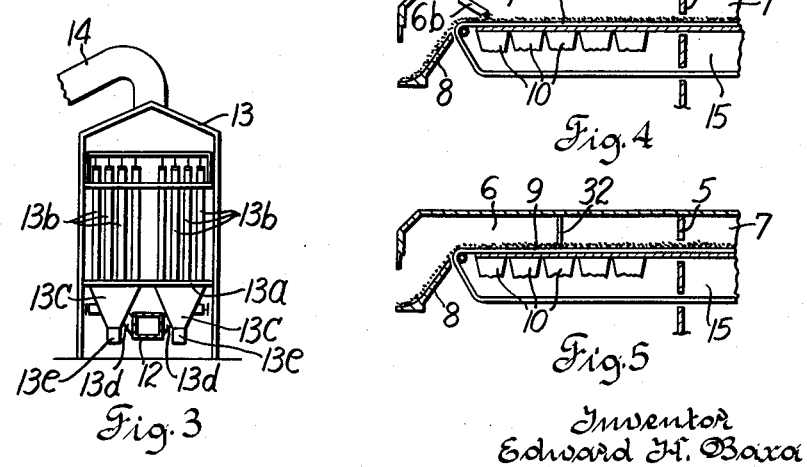
Inventor
Edward H. Baxa
By Arthur M. Streich
Attorney 3,110,483
METHOD OF AND APPARATUS FOR REMOVING ALKALI FROM CEMENT SYSTEM
Edward H. Baxa, Brookfield, Wis., assignor to Allis-Chalmers Manufacturing Company, Milwaukee, Wis.
Filed Aug. 15, 1961, Ser. No. 131,618
16 Claims. (Cl. 263—28)

This invention relates to production of cement by burning raw material to produce cement clinker. Specifically, it is a process whereby the final cement product is low in alkali.

The presence of alkali in cement may result in certain undesirable characteristics such as a tendency to flake or to develop structural weaknesses. These tendencies have caused antipathy by potential cement purchasers toward high alkaline cement. This factor, plus the great diversity and specialization of types of cement used in modern construction applications, has created a situation where it is desirable to keep the alkali content of cement at a minimum.

Rotating kilns, for making cement, that dischrage relatively high temperature gases directly to a stack (for dispersing the gases to the atmosphere) do not produce cement containing an objectionable amount of alkali. However, such plants have relatively high fuel requirements of the order of 750,000 to 1,000,000 B.t.u. per barrel of cement clinker. Much lower fuel consumption, of the order of 600,000 B.t.u. per barrel, has been achieved when a traveling grate is placed between the gas discharge end of the kiln and the stack. However, for reasons that will be discussed, this more efficient arrangement is more likely to produce cement with a higher alkali content than an arrangement without a grate. With such high efficiency equipment, cement raw material is advanced along the grate and fed into the gas discharge end of the kiln. While the raw material is on the grate it is twice exposed to the kiln exit (combustion) gases that are on their way to the stack. By suitable duct work and baffle structure the kiln exit gases are caused to make two downward passes through the raw material on the grate as the material is carried toward the raw material feed inlet end of the kiln (which is the gas exit end of the kiln). The first exposure of a particular quantity of the raw material to the gases is for the purpose of drying wet agglomerates made from finely divided raw material. The dry agglomerates are then exposed to high temperature kiln exit gases for the purpose of preheating the agglomerates to give them sufficient strength to withstand final burning in the kiln with little or no degradation. In this high efficiency equipment, gases discharge from the kiln at about 1800° F. On the first pass through the agglomerates on the grate, the kiln exit gases preheat previously dried agglomerates and the gases themselves are cooled to about 500° F.; and, on the second pass of the gases through the agglomerates on the grate, the gases dry previously wet formed agglomerates and the gases are further cooled to about 200° F. at which time the gases are permitted to enter the stack for discharge to the atmosphere. This latter equipment is more efficient and cleaner operating than the former for two reasons: firstly, so much more of the heat released by burning fuel in the kiln is transferred to the material (because of the additional exposure while making a double pass through material on the grate), and accordingly, so much less heat is wasted up the stack to atmosphere; and, secondly, the double pass of gases through the material on the grate results in filtering the gases before they are permitted to go up the stack to the atmosphere of the surrounding community. This inherent filtering action of a double pass of gases through material on the grate is supplemented by directing the gases through the cyclone dust separators after the first pass through material on the grate but before the second pass. Cyclone dust separators are well known devices that are effective to remove particles 12 to 15 microns and larger. It has been conventional practice for this material to be mixed with raw material feed and reintroduced into the system.

The high efficiency equipment that has been described has been found to produce a finished cement clinker having a high alkali content than that produced by the lower efficiency equipment described earlier. This appears to be a direct result of the greater utilization of the available heat and the correspondingly lower temperatures of gases discharged to the stack. In this high efficiency system alkaline vapors that are generated in the kiln are not discharged up the stack as they are when equipment is used that discharges high temperature gases directly to the stack. With this high efficiency system the low temperatures reached after the gases exit from the kiln, but before they go up the stack, cause the alkaline vapors to sublimate and precipitate on the raw material on the grate and the dust hovering over the grate. The filtering action of the gases through raw material on the grate removes the alkaline substances carried as dust particles or on fine dust particles thus preventing the alkali from getting out of the system with the gases. This continual recovery of alkali produces cement clinker with an alkali content higher than is desired because the kiln reaches a supersaturated alkaline condition that retards the evaporation of alkalies out of the raw material when it is given the final heating in the kiln.

The nature of the present invention resides in and stems from the inventor's teaching that a significant portion of the precipitated alkaline in the high efficiency system described is in the form of very fine particles that are passed through the cyclone dust collectors with the carrier gases, and consequently are deposited on the material when the gases make their second pass through the material on the grate. The inventor teaches that an improved process for making low alkaline cement clinker can therefore be carried out on improved apparatus of the described high efficiency type by filtering the dust laden kiln exit gases after they have passed through the cyclone dust separators, but before they make their second pass through raw material on the grate, to remove from the gases the smallest particle sizes that can be caught in such gases and to exclude such particles from further cement making operations.

The objects of this invention are to produce, with a high efficiency traveling grate and rotating kiln cement making apparatus, a final cement clinker that is sufficiently low in alkali content to meet the more critical commercial requirements; to produce such cement clinker by a practicable and commercially feasible method; and to enhance the commercial advantages of such method by the incidental production of a commercially valuable by-product.

Other objects and advantages will be apparent from the following detailed description of a typical installation where this process could be used.

FIG. 1 is an illustration of a high efficiency traveling grate and rotating kiln installation with a modification that embodies this invention;

FIG. 2 is a side view of the same installation taken along line II—II, as shown in FIG. 1, with some structure broken away to show the interior of some portions of the equipment;

FIG. 3 is a side view of the filtering housing structure shown in FIG. 1 taken along line III—III of FIG. 1 with the facing wall removed;

FIG. 4 is a simplified portion of FIG. 2 showing a modification of this invention; and FIG. 5 is a simplified portion of FIG. 2 showing another modification of this invention.

Referring to FIGS. 1 and 2, it is seen that the installation consists of a feeder bin 1, a pelletizer mechanism 2, and a traveling grate hood structure 3. At the end of the grate hood structure 3, away from the feeder bin 1 and pelletizer mechanism 2, a rotating kiln 4 is placed so as to form a continuous and relatively gas tight envelope with the grate hood structure. The grate hood structure is divided into separate compartments by a separating wall 5. The compartment nearest the kiln is a preburning chamber 6 and the compartment away from the kiln is a drying chamber 7. To facilitate the passage of material into the kiln 4 there is a chute 8 within the hood structure 3 and adjacent to the kiln. Within the grate hood structure 3 there is a gas pervious traveling grate 9, with its direction of movement from the drying chamber 7 to the preburning chamber 6, for transporting material from the depositing point at the pelletizer mechanism 2 to the chute 8. Beneath and enclosed with the preburning chamber 6, there are a series of funnels 10 open to the preburning chamber 6 through the gas pervious traveling grate 9. Cyclone dust separators 11 are connected to the narrower and lower ends of the funnels 10. The cyclone dust separators have a gas entrance port for introduction of gases with dust suspended in them, a gas outlet port for the discharge of the gases after the dust has been removed by the effect of the cyclones, and a dust exit port at the bottom of the separator for allowing the removal of the dust that has been separated from the gases. A collecting conduit 12 connects the outlet ports of the cyclone dust separators and the lower part of a housing structure 13 for enclosing a filtering means (as shown in FIG. 3). The housing structure 13 is joined with the drying chamber 7 by means of a connecting conduit 14. Directly beneath the drying chamber 7 is a suction chamber 15 which is open to the drying chamber 7 through the traveling grate 9. Connected to the suction chamber 15 is an exhaust structure comprised of an inverted L-shaped exhaust conduit 16, a connecting pipe 17 and an exhaust stack 18.

Beneath the cyclone dust separators 11, and connected thereto, are dust collectors 19 which are open to and connected to a conveyor belt housing structure 20 at a point immediately above a conveyor belt 21. At the opposite end of the conveyor belt there is a storage bin 22.

Referring to FIG. 3, the housing structure 13 has a gas tight, enclosed portion within its sides, top and base 13a. There are gas passage openings in this enclosed portion for connection to a connecting conduit 14 and to gas permeable filtering bags 13b. The openings for the gas permeable filtering bags are in the base 13a. In order to direct the incoming gases to these openings, gas entrance cones 13c are attached to the underside of the base 13a and have openings in the side and bottom. The side openings are connected, by means of distribution conduits 13d, to a collecting conduit 12 that conveys gases from the cyclone dust separators 11 (as shown in FIG. 2). The bottom openings are connected to dust collecting chambers 13e from which dust filtered out of the gases by the filtering bags may be easily removed. The filtering bags 13b are cylindrically shaped and attached to the base 13a in such a manner that gases entering into the gas entrance cones 13c, must pass into the inner part and thence through the mesh of the filtering bags in order to reach the connecting conduit 14.

In the operation of the installation thus far described, raw material to be processed is introduced into the system by transportation to a feeder bin 1 which, as shown in FIG. 2, passes the material to a pelletizer mechanism 2. The pellets are produced as moist nodules or agglomerates and deposited onto a gas pervious traveling grate 9 at a uniform depth and conveyed through a drying chamber 7, through a separating wall 5, through a preburning chamber 6, and into a kiln 4 by means of a chute 8.

Hot gases produced by burning of suitable fuel and material in the kiln 4 are drawn through the preburning chamber 6 by any convenient means, such as a fan (not shown) located in a collecting conduit 12. From the preburning chamber 6 the gases are passed through the material and traveling grate located within the preburning chamber, through funnels 10, and through cyclone dust separators 11. The cyclone dust separators cause dust about 12 to 15 microns and larger in size present in the gases to be precipitated into dust collectors 19. The gases are then passed through the collecting conduit 12, through a housing structure 13 (as shown in FIGS. 1 and 3), through a connecting conduit 14, and to the drying chamber 7. The gases are then passed from the drying chamber, through the raw material and traveling grate located within the drying chamber, into and through a suction chamber 15, and through an exhaust conduit 16 from where they are discharged into the atmosphere by passing through a connecting pipe 17 and exhaust stack 18.

The dust collected in the dust collectors 19 is deposited on a transporting device such as a conveyor belt 21 located within a conveyor belt housing 20. The conveyor belt transports the dust collected to a raw material storage bin 22 where it is mixed with raw material feed and eventually returned into the system by introduction into the feeder bin 1.

Referring to FIG. 3, the gases from the cyclone dust separators 11, after separation of dust particles of about 12 to 15 microns and larger in size, are passed by distribution pipes 13d into gas entrance cones 13c from where they pass through filtering bags 13b, into the enclosed chamber of the housing structure 13, and into the connecting conduit 14. The dust filtered out of the gas stream is retained on the inside of the cylindrical filter bags and precipitates to the bottom of the gas entrance cones 13c and into the collecting chambers 13e.

The filtering bags may be of any material that will withstand the temperatures encountered and may be of any mesh desired for particular circumstances. Such filtering bags are commercially available; for example, the Therm-O-Flex high temperature dust collector manufactured by the Western Precipitation Corporation. Since it may not be desirable in all cases to retain the dust collected for some reason, the dust may be discarded; however, because of its high alkaline content it can readily be commercially utilized for non-cement purposes, such as fertilizer.

Referring to FIG. 4, it may be desirable to agitate material as it passes through the preburning chamber in such a manner that dust that has deposited on and adhered to it is loosened and consequently suspended again in the gas stream. This results in less of the dust being passed into the kiln on the material and, therefore, allows more to be passed on for subsequent separation. To accomplish this, a high pressure gas is introduced by means of a connecting gas pipe 6a and directed through a gas nozzle 6b onto the material.

Referring to FIG. 5, another way to create this agitation is accomplished by suspending a set of stirring rods 32 from the top of the grate hood structure 3 to cause the material, as it passes by these rods, to be pushed aside and move sufficiently to loosen the dust and allow it to be carried by the gases to the subsequent separating devices.

Having now particularly described and ascertained the nature of my said invention and the manner in which it is to be performed, I declare that what I claim is:

1. A method for reducing the alkali content of cement clinker and producing as a byproduct alkaline dust that may be used as a fertilizer, comprising the steps of:
   first, feeding cement raw material through drying, preburning, and final burning zones successively;
   second, directing a flow of hot dust laden gases from the final burning zone through the material in the preburning zone;

third, conducting the flow of gases from the preburning zone through the material in the drying zone;

fourth, collecting dust particles of about 12 to 15 microns and larger from the gases after the gases have passed through the preburning zone but before the gases have entered the drying zone;

fifth, after the aforesaid fourth step but still before the gases pass into the drying zone, the added step of collecting dust particles smaller than about 12 to 15 microns from the gases; and, sixth, adding only the portion of dust comprising the larger size particles to material for feeding through the drying zone in the aforesaid manner.

2. A method for reducing the alkali content of cement clinker and producing as a byproduct alkaline dust that may be used as a fertilizer, comprising the steps of:

first, feeding cement raw material through drying, preburning, and final burning zones sucessively;

second, directing a flow of hot dust laden gases from the final burning zone through the material in the preburning zone;

third, conducting the flow of gases from the preburning zone through the material in the drying zone; and fourth, after the gases have passed through the preburning zone but before the gases pass into the drying zone, treating the gases to collect only those dust particles smaller than about 12 to 15 microns from the gases and excluding these smaller size particles from further cement making operation.

3. A method for reducing the alkali content of cement clinker and producing as a byproduct alkaline dust that may be used as a fertilizer, comprising the steps of:

first, feeding cement raw material through drying, preburning, and final burning zones successively;

second, directing a flow of hot dust laden gases from the final burning zone through the material in the preburning zone;

third, conducting the flow of gases from the preburning zone through the material in the drying zone;

fourth, collecting the gases after they have passed through the preburning zone but before they have entered the drying zone and directing these gases through cyclone dust separators to separate dust particles of about 12 to 15 microns and larger from the gases;

fifth, after the gases have passed through the cyclone dust separators but still prior to their entering the drying zone, directing the gases through a gas permeable bag to collect particles smaller than about 12 to 15 microns;

sixth, adding the portion of dust comprising the 12 to 15 micron and larger size particles to material for feeding through the drying zone in the aforesaid manner; and, seventh, excluding the portion of dust comprising the particles smaller than 12 to 15 microns from further cement making operations and diverting this portion to byproduct ends.

4. A method for reducing the alkali content of cement clinker and producing as a byproduct alkaline dust that may be used as a fertilizer, comprising the steps of:

first, feeding cement raw material through drying, preburning, and final burning zones successively;

second, directing a flow of hot dust laden gases from the final burning zone through the material in the preburning zone;

third, agitating dust on the material in the preburning zone so that the dust precipitating on the material will become suspended in the gases;

fourth, conducting the flow of gases from the preburning zone through the material in the drying zone;

fifth, collecting dust particles of about 12 to 15 microns and larger from the gases after the gases have passed through the preburning zone but before the gases have entered the drying zone;

sixth, after the aforesaid fifth step but still before the gases pass into the drying zone, the added step of collecting dust particles smaller than about 12 to 15 microns from the gases;

seventh, adding the portion of dust comprising the larger size particles to material for feeding through the drying zone in the aforesaid manner; and, eighth, excluding the portion of dust comprising the smaller size particles from further cement making operations and diverting this portion to byproduct ends.

5. A method for reducing the alkali content of cement clinker and producing as a byproduct alkaline dust that may be used as a fertilizer, comprising the steps of:

first, feeding cement raw material through drying, preburning, and final burning zones successively;

second, directing a flow of hot dust laden gases from the final burning zone through the material in the preburning zone;

third, subjecting the material in the preburning zone to a high velocity gas current so that the dust precipitating on the material will become suspended in the gases;

fourth, conducting the flow of gases from the preburning zone through the material in the drying zone;

fifth, collecting dust particles of about 12 to 15 microns and larger from the gases after the gases have passed through the preburning zone but before the gases have entered the drying zone;

sixth, after the aforesaid fifth step but still before the gases pass into the drying zone, the added step of collecting dust particles smaller than about 12 to 15 microns from the gases;

seventh, adding the portion of dust comprising the larger size particles to material for feeding through the drying zone in the aforesaid manner; and, eighth, excluding the portion of dust comprising the smaller size particles from further cement making operations and diverting this portion to byproduct ends.

6. For reducing the alkali content of cement clinker and producing as a byproduct alkaline dust that may be used as a fertilizer:

means feeding cement raw material through drying, preburning, and final burning zones successively;

means directing a flow of hot dust laden gases from the final burning zone through the material in the preburning zone;

means conducting the flow of gases from the preburning zone through the material in the drying zone;

means collecting dust particles of about 12 to 15 microns and larger from the gases after the gases have passed through the preburning zone but before the gases have entered the drying zone;

means, after the aforesaid larger particle collecting means but still before the gases pass into the drying zone, collecting dust particles smaller than about 12 to 15 microns from the gases; and, means adding only the portion of dust comprising the larger size particles to material for feeding through the drying zone in the aforesaid manner.

7. For reducing the alkali content of cement clinker and producing as a byproduct alkaline dust that may be used as a fertilizer:

means feeding cement raw material through drying, preburning, and final burning zones successively; means directing a flow of hot dust laden gases from the final burning zone through the material in the preburning zone;

means conducting the flow of gases from the preburning zone through the material in the drying zone; and means, after the gases have passed through the preburning zone but before the gases pass into the drying zone, treating the gases to collect only those dust particles smaller than about 12 to 15 microns from the gases and excluding these smaller size particles from further cement making operations.

8. For reducing the alkali content of cement clinker and producing as a byproduct alkaline dust that may be used as a fertilizer:

means feeding cement raw material through drying, preburning, and final burning zones sucessively;

means directing a flow of hot dust laden gases from the final burning zone through the material in the preburning zone;

means conducting the flow of gases from the preburning zone through the material in the drying zone;

means collecting dust particles of about 12 to 15 microns and larger from the gases after the gases have passed through the preburning zone but before the gases have entered the drying zone;

means, after the aforesaid larger particle collecting means but still before the gases pass into the drying zone, collecting dust particles smaller than about 12 to 15 microns from the gases;

means adding only the portion of dust comprising the larger size particles to material for feeding through the drying zone in the aforesaid manner; and, means agitating dust on the material in the preburning zone so that the dust precipitating on the material will become suspended in the gases.

9. For reducing the alkali content of cement clinker and producing as a byproduct alkaline dust that may be used as a fertilizer:

means feeding cement raw material through drying, preburning, and final burning zones successively;

means directing a flow of hot dust laden gases from the final burning zone through the material in the preburning zone;

means conducting the flow of gases from the preburning zone through the material in the drying zone;

means, after the gases have passed through the preburning zone but before the gases pass into the drying zone, treating the gases to collect only those dust particles smaller than about 12 to 15 microns from the gases and excluding these smaller size particles from further cement making operations; and, means agitating dust on the material in the preburning zone so that the dust precipitating on the material will become suspended in the gases.

10. In combination, a kiln for burning cement raw material to produce cement and a traveling grate for pretreating raw material before it enters the kiln, with hood structure surrounding the grate to define a drying chamber and a preburning chamber; means for feeding material to the grate whereby it is transported through the drying chamber and preburning chamber; means whereby the material is transported from the preburning chamber into the kiln; means for drawing combustion gases from the kiln to the preburning chamber and through the material in the preburning chamber; means for directing the combustion gases from the preburning chamber to the drying chamber to pass them through the material in the drying chamber; means for exhausting the combustion gases from the drying chamber; separating means, interposed between the preburning chamber and the drying chamber, for separating only those dust particles smaller than about 12 to 15 microns from the combustion gases so that these smaller particles can be excluded from further cement making operations.

11. In combination, a kiln for burning cement raw material to produce cement and a traveling grate for pretreating raw material before it enters the kiln, with hood structure surrounding the grate to define a drying chamber and a preburning chamber; means for feeding material to the grate whereby it is transported through the drying chamber and preburning chamber; means whereby the material is transported from the preburning chamber into the kiln; means for drawing combustion gases from the kiln to the preburning chamber and through the material in the preburning chamber; means for directing the combustion gases from the preburning chamber to the drying chamber to pass them through the material in the drying chamber; means for exhausting the combustion gases from the drying chamber; first separating means, interposed between the preburning chamber and the drying chamber, for separating dust particles of about 12 to 15 microns and larger from the combustion gases; second separating means, interposed between the first separating means and the drying chamber, for separating dust particles smaller than about 12 to 15 microns from the combustion gases; and, means for returning the separated dust articles from the first separating means to material being fed to the grate.

12. In combination, a kiln for burning cement raw material to produce cement and a traveling grate for pretreating raw material before it enters the kiln, with hood structure surrounding the grate to define a drying chamber and a preburning chamber; means for feeding material to the grate whereby it is transported through the drying chamber and preburning chamber; means whereby the material is transported from the preburning chamber into the kiln; means for drawing combustion gases from the kiln to the preburning chamber and through the material in the preburning chamber; means for mechanically stirring the material on the grate in the preburning chamber; means for directing the combustion gases from the preburning chamber to the dryng chamber to pass them through the material in the drying chamber; means for exhausting the combustion gases from the drying chamber; first separating means, interposed between the preburning chamber and the drying chamber, for separating dust particles of about 12 to 15 mircons and larger from the combustion gases, second separating means, interposed between the first separating means and the drying chamber, for separating dust particles smaller than about 12 to 15 microns from the combustion gases; and, means for returning the separated dust particles from the first separating means to material being fed to the grate.

13. In combination, a kiln for burning cement raw material to produce cement and a traveling grate for pretreating raw material before it enters the kiln, with hood structure surrounding the grate to define a drying chamber and a preburning chamber; means for feeding material to the grate whereby it is transported through the drying chamber and preburning chamber; means whereby the material is transported from the preburning chamber into the kiln; means for drawing combustion gases from the kiln to the preburning chamber and through the material in the preburning chamber; means for subjecting the material on the grate in the preburning chamber to a high velocity gas current; means for directing the combustion gases from the preburning chamber to the drying chamber to pass them through the material in the drying chamber; means for exhausting the combustion gases from the drying chamber; first separating means, interposed between the preburning chamber and the drying chamber, for separating dust particles of about 12 to 15 microns and larger from the combustion gases; second separating means, interposed between the first separating means and the drying chamber, for separating dust particles smaller than about 12 to 15 microns from the combustion gases; and, means for returning the separated dust particles from the first separating means to material being fed to the grate.

14. In combination, a kiln for burning cement raw material to produce cement and a traveling grate for pretreating raw material before it enters the kiln, with hood structure surrounding the grate to define a drying chamber and a preburning chamber; means for feeding material to the grate whereby it is transported through the drying chamber and preburning chamber; means whereby the material is transported from the preburning chamber into the kiln; means for drawing combustion gases from the kiln to the preburning chamber and through the material in the preburning chamber; means for directing the combustion gases from the preburning chamber to the drying chamber to pass through the material in the drying chamber; means for exhausting the combustion gases from the drying chamber; cyclone dust separating means interposed in the combustion gases stream between the preburning chamber and the drying chamber; means, interposed between the cyclone dust separating means and the drying chamber, for separating dust particles smaller than about 12 to 15 microns from the combustion gases; and, means for returning the separated dust particles from the cyclone dust separating means to material being fed to the grate.

15. In combination, a kiln for burining cement raw material to produce cement and a traveling grate for pretreating raw material before it enters the kiln, with hood structure surrounding the grate to define a drying chamber and a preburning chamber; means for feeding material to the grate whereby it is transported through the drying chamber and preburning chamber; means whereby the material is transported from the preburning chamber into the kiln; means for drawing combustion gases from the kiln to the preburning chamber and through the material in the preburning chamber, means for directing the combustion gases from the preburning chamber to the drying chamber to pass them through the material in the drying chamber; means for exhausting the combustion gases from the drying chamber; first separating means, interposed between the preburning chamber and the drying chamber, for separating dust particles of about 12 to 15 microns and larger from the combustion gases; a plurality of gas permeable filtering bags interposed, in parallel and in the combustion gases stream, between the first separating means and the drying chamber; and, means for returning the separated dust particles from the first separating means to material being fed to the grate.

16. In combination, a kiln for burning cement raw material to produce cement and a traveling grate for pretreating raw material before it enters the kiln, with hood structure surrounding the grate to define a drying chamber and a preburning chamber; means for feeding material to the grate whereby it is transported through the drying chamber and preburning chamber; means whereby the material is transported from the preburning chamber into the kiln; means for drawing combustion gases from the kiln to the preburning chamber and through the material in the preburning chamber; means for directing the combustion gases from the preburning chamber to the drying chamber to pass them through the material in the drying chamber; means for exhausting the combustion gases from the drying chamber; cyclone dust separators interposed, in parallel and in the combustion gases stream, between the preburning chamber and the drying chamber; a plurality of gas permeable filtering bags interposed, in parallel and in the combustion gases stream, between the cyclone dust separators and the drying chamber; and means for returning the separated dust particles from the cyclone dust separators to material being fed to the grate.

References Cited in the file of this patent

UNITED STATES PATENTS

| | | |
|---|---|---|
| 2,214,345 | Pike | Sept. 10, 1940 |
| 2,477,262 | Mooser | July 26, 1949 |
| 2,750,182 | Petersen | June 12, 1956 |
| 2,796,249 | Plass | June 18, 1957 |
| 2,965,366 | O'Mara et al. | Dec. 20, 1960 |